F. M. HARRIS.
End Gate.
No. 11,065. Patented June 13, 1854.
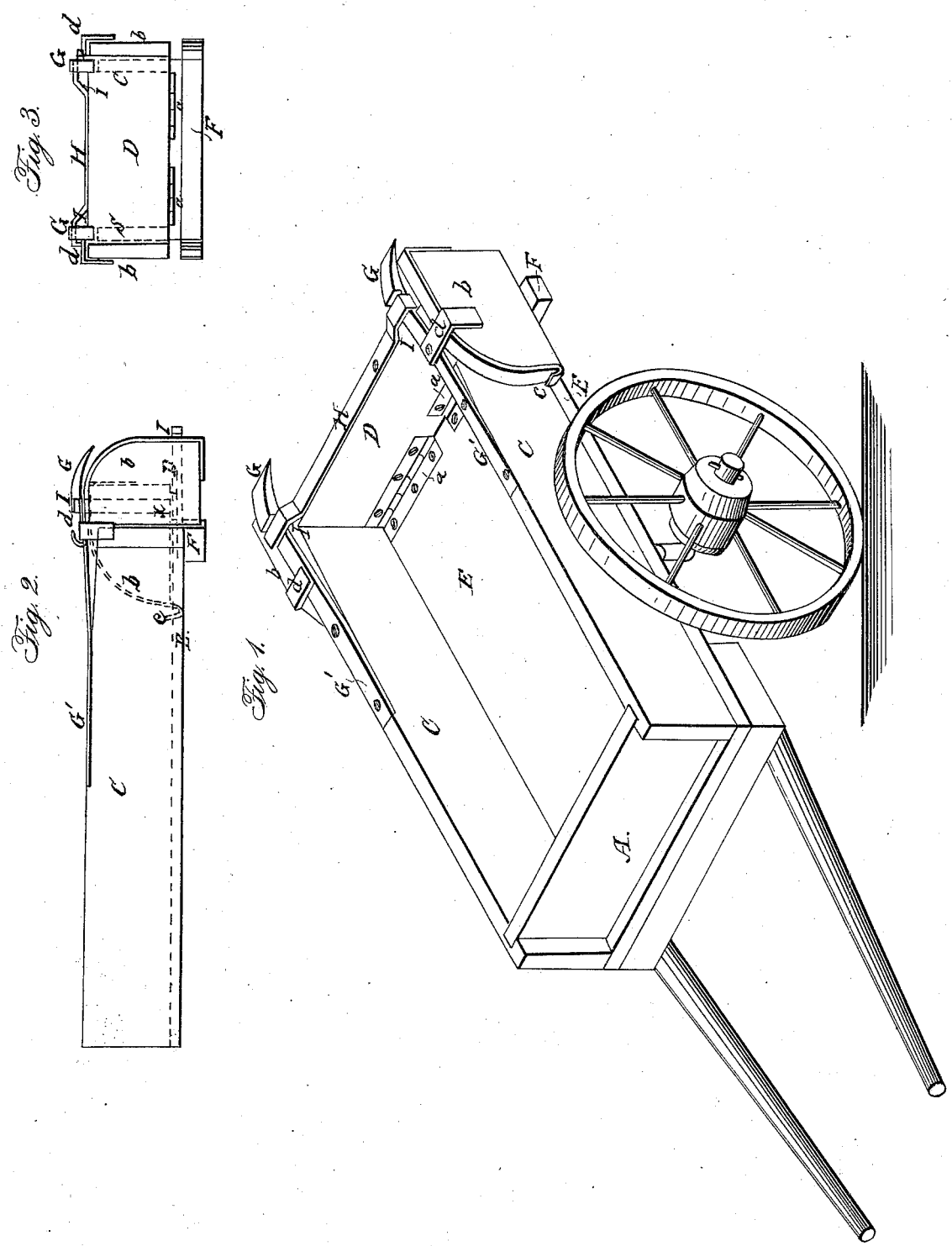

UNITED STATES PATENT OFFICE.

F. M. HARRIS, OF CARROLL, OHIO.

TAIL-BOARD OF WAGONS.

Specification of Letters Patent No. 11,065, dated June 13, 1854.

*To all whom it may concern:*

Be it known that I, F. M. HARRIS, of Carroll, in the county of Fairfield and State of Ohio, have invented a new and useful Improvement in Tail Boards or Gates for Wagons; and I do hereby declare that the following is a full, clear, and exact description of the same, reference being had to the accompanying drawing, forming part of this specification, in which—

Figure 1, is a perspective view of a wagon, having my improved tail board or gate applied to it. Fig. 2, is a side elevation of the same—the tail board being shown lowered to a horizontal position, by black lines, and raised to a vertical position and locked, by red lines. Fig. 3, is a view of the back end of the wagon.

Similar letters of reference in each of the several figures indicate corresponding parts.

This invention relates to a new and useful improvement in the manner of constructing, and attaching and locking tail boards of corn and other wagons, whereby several important objects are effected:

1st, the length of the bottom and the side boards of the wagon is increased simultaneous with the lowering of the tail board; and consequently, the liability of the articles contained in the wagon, falling into the mud, or dirt, as the tail board is lowered, is avoided. No time is lost in picking up the ears of corn nearest the tail board, with the hand, in unloading, for the increased length of the bottom of the wagon serves to receive the ears of corn as they roll down when the tail board is lowered, and therefore the driver can commence immediately to unload with a " scoop," or shovel.

2d, the tail board is perfectly self locking, and can be raised to a vertical position, and caused to lock itself in an instant after unloading; and can be unlocked almost as speedily, when necessary.

To enable others skilled in the art to make and use my invention, I will proceed to describe it more minutely.

A, B, C, D, represent the body of a corn or other wagon. The tail board D, is hinged to the bottom, E, by the hinges, *a, a*. It has two side pieces, *b, b*, of segmental shape, attached to it, said pieces taking their position outside of the side boards, C, C, of the body of the wagon when the tail board is locked, as shown in Fig. 1, and serving to increase the length of the said side boards when the tail board is lowered to a horizontal position, as shown in Fig. 2.

*c*, is a hook on each of the side pieces for retaining the tail board in a horizontal position. This hook catches against the elbow shaped piece, *d*, attached fast to spring catches, and thereby holds the tail gate in a horizontal position. The elbow shaped stops serve for the hooks, *c*, of the side pieces of the tail board to catch against, and also for holding the side boards of the body of the wagon together, when the wagon is loaded, and the gate or tail board locked.

F, is a cross bar under the bottom of the body of the wagon, for the tail gate or board to rest upon while in a horizontal position. This cross bar is arranged directly under the line of junction of the tail board with the bottom, E, of the body of the wagon and thereby makes a perfectly tight joint.

G, G, G′, G′, are two metal spring catches, attached fast by their spring ends to the top edge of the side boards, C, C, of the body of the wagon.

H, is a metal strip attached to the top of the tail board. It is of the same width as the tail board, and has an eye, I, formed on each of its ends. Through these eyes, as the tail board is raised and forced home, the catches, G, G, of the springs, G′, pass, and are caused to remain, by the power of said springs, until said power is withdrawn, which can be effected by pressing, in a vertical position, with the thumb upon the top of the catches. The catches being depressed, the tail board can be lowered to a horizontal position. These catches are depressed in like manner, as the tail board is raised and locked by means of the eyes, I, I, as said eyes are forced over the catches—thus it will be seen, the tail board is self locking.

The manner in which the spring catches pass through the eyes of the strap, H, will be clearly seen in Figs. 1 and 2.

What I claim as my invention, and desire to secure by Letters Patent, is:

1. The manner herein described, of rendering the tail gate or board capable of increasing the length of the body of the wagon, when lowered to a horizontal position, substantially as, and for the purpose herein set forth.

2. I also claim the combination of the spring catches, G, G', eye strap, H, I; hinged tail board, D; elbow shaped pieces, d, d; and hooks, c, c, for the purpose of rendering the tail gate self locking, and also capable of resting in a horizontal position while unloading, substantially as and for the purpose herein described.

F. M. HARRIS.

Witnesses:
G. STIMMAN,
ROBERT McFARLAND.